May 17, 1955 H. N. STONE 2,708,622
PROCESS OF MAKING ABRASIVE PHENOLIC RESIN MIXES
Filed Oct. 20, 1951
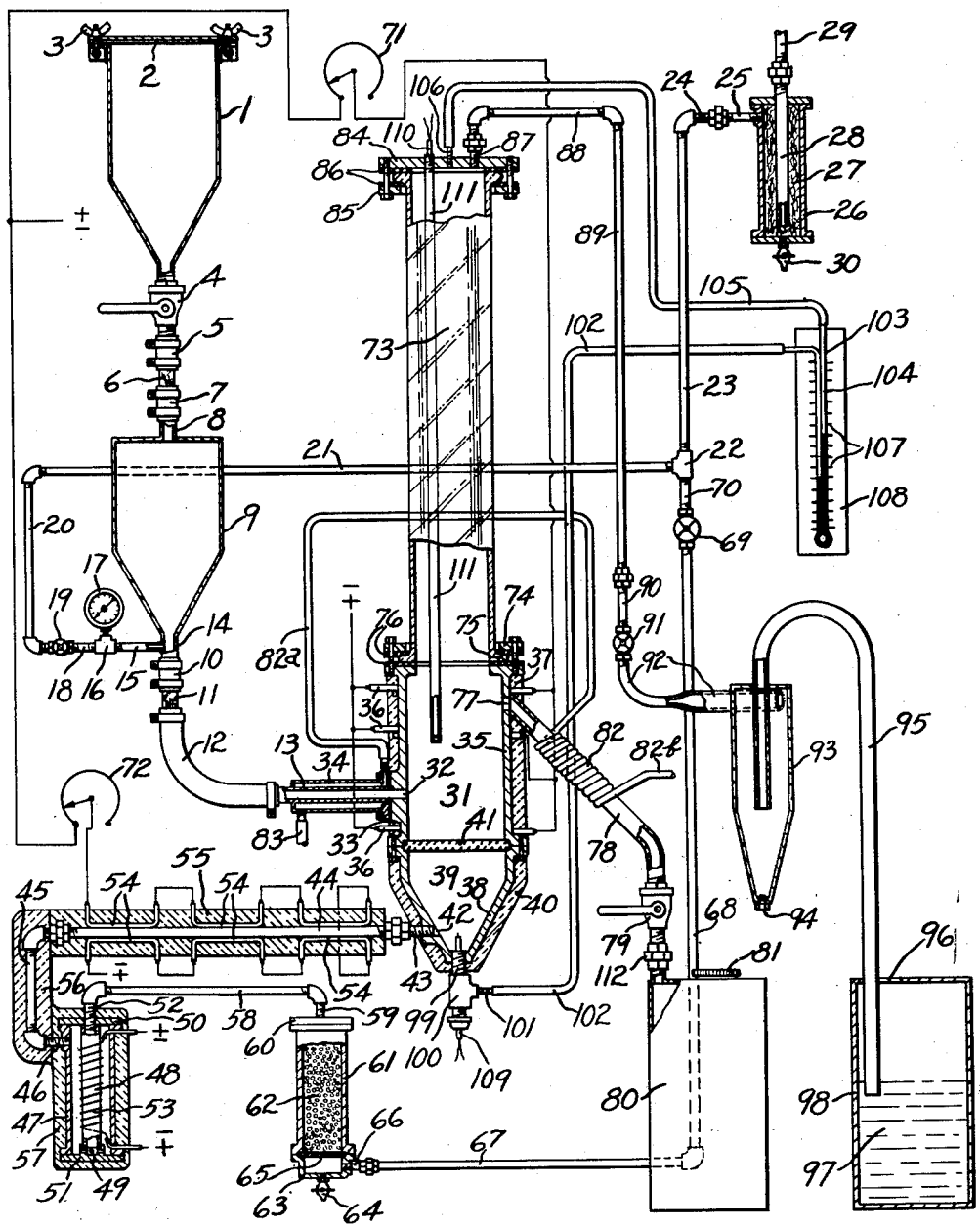
Inventor
H. NATHAN STONE
By George Crompton
Attorney United States Patent Office 2,708,622
Patented May 17, 1955

2,708,622

PROCESS OF MAKING ABRASIVE PHENOLIC RESIN MIXES

Hyman Nathan Stone, Worcester, Mass., assignor to Norton Company, Worcester, Mass., a corporation of Massachusetts Application October 20, 1951, Serial No. 252,391

6 Claims. (Cl. 51—293)

The invention relates to the manufacture of abrasive phenolic resin mixes for the manufacture of abrasive products such as grinding wheels and the invention provides an improved process for the manufacture of such mixes.

One object of the invention is to produce a free-flowing mix. Another object of the invention is to produce a mix which will not stick to the hoppers, mold bands, mold plungers or plates or the charging devices of an automatic molding machine. Another object of the invention is to produce a complete pick-up abrasive phenolic resin mix by which I mean a mix of this character having substantially no loose resin. Other objects of the invention are to produce abrasive phenolic resin mixes from which grinding wheels can be manufactured which have more uniform balance, more consistent values for the modulus of elasticity, higher breakage speeds and better appearance. Another object of the invention is to produce more stable mixes, that is to say mixes which do not deteriorate over long periods of storage.

Another object of the invention is to produce superior abrasive phenolic resin mixes for cold molding. Another object of the invention is to extend the use of the cold molding and subsequent curing in an oven technique by providing a process which will make a wider range of abrasive phenolic resin mixes which are suitable for cold molding. Another object of the invention is to make abrasive phenolic resin mixes which can be used to make, using the cold molding technique, denser wheels than could hitherto be made by the cold molding technique. Another object is to produce mixes which can be successfully used in automatic molding machines and will not give trouble therein, thus greatly reducing the cost of making wheels of abrasive and phenolic resin bond.

Other objects will be in part obvious or in part pointed out hereinafter.

The drawing illustrates in reasonable detail apparatus actually used to carry out the invention, many portions of the apparatus being shown in section, the remainder being shown in elevation with the wiring illustrated diagrammatically, and the drawing also functions as a flow diagram.

In one aspect of the invention I start with an abrasive phenolic resin mix made by standard procedure but in another aspect of the invention I start with abrasive, phenolic resin powder and a plasticizer (and usually but optionally with filler material, active or not). While the process can be carried out using any abrasive at all, the abrasives widely used in manufacturing phenolic resin bonded abrasive products are silicon carbide and the various varieties of alumina, such as white fused alumina, regular fused alumina, alumina in discrete crystal form and natural corundum. Diamonds also are used to make great quantities of abrasive articles bonded with phenolic resin bond. As the foregoing is now well known I need not further elaborate.

The resin powder can be any variety of reactive phenolic resin. This is the condensation product of phenol and formaldehyde or, in place of formaldehyde, some other compound or a mixture of compounds providing methylene or substituted methylene groups can be used. The reactive resin is but partially polymerized and usually contains some hexamethylenetetramine to promote curing to the thermo-irreversible phase. Commercial reactive phenolic resin in the powder form usually contains a small quantity of cresol-formaldehyde and such is of course included within this invention. The word "phenol" has a double meaning; broadly it defines the group consisting of phenol

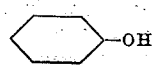

and the cresols and xylenols and narrowly it indicates only phenol

By "reactive phenolic resin" I indicate the thermo-reactive condensation product of a, broadly speaking, phenolic substance with formaldehyde or other substance (e. g. furfural) yielding methylene or substituted methylene groups which under the application of heat will yield a thermo-irreversible polymer whether it contains hexamethylenetetramine or other addition agents or not, and this is a customary and well understood use of the term "reactive phenolic resin."

The word "plasticizer" has a special but still well understood meaning in the abrasive art. The "plasticizer" which is a liquid does not literally make the hard abrasive plastic; it wets the abrasive which can then pick up the powder and the resultant mix is plastic for molding. Thus in the art of making vitrified ceramic bonded abrasive articles water is the common "plasticizer" because the abrasive grains are first wet with water after which they can pick up the dry powdered clay or the like and the resultant mix is plastic for molding. A plasticizer for in making an abrasive phenolic resin mix should be capable of picking up the powdered reactive phenolic resin but any compatible liquid which is a solvent for such powdered reactive phenolic resin can be used as such plasticizer. However I prefer to use one of the plasticizers hereinafter mentioned.

As conducive to a better understanding of my invention I will now briefly describe the standard way of making an abrasive phenolic resin mix because I can use such standard way in one embodiment of my invention and in another embodiment I use a modification thereof. A mixing machine of any desired type is charged with dry abrasive and then the liquid plasticizer is added and the abrasive and liquid are thoroughly mixed until all of the abrasive grains are wet. The plasticizers for the manufacture of phenolic resin bonded grinding wheels and other abrasives have been furfural and liquid reactive phenolic resin. Subsequently the powdered reactive phenolic resin (and filler if any) is added and the mixing is continued until the abrasive grains have picked up all of the powder that they ever would pick up by continued mixing. But heretofore it has been bad practice to provide so much of the plasticizer as would pick up all or nearly all of the powder since mixes so made would cake up before they could be used. And heretofore abrasive phenolic resin mixes had to be used up in molding within two or three hours manufacture or good quality abrasive bodies could not be made therefrom by the cold molding technique. In fact practically all of such mixes made by the above described standard procedure would cake or too many particles thereof would aggregate in much less than a day's time.

As the first step in my process I procure or make a mix as above described but I prefer to have used or to use enough of the plasticizer (e. g. liquid furfural or liquid reactive phenolic resin) to pick up nearly all of the powder, leaving less than 1% free powder (by weight) on the total mix. The mix so procured or made is now ready for processing to give it the characteristics indicated in the objects and as will hereinafter be described and with such processing, which will now be described, my invention is particularly concerned.

The drawing is illustrative of apparatus which can be used but my invention is not limited to the use of any particular apparatus although for ease of understanding I shall, as I describe the process, give details of the apparatus used.

Referring now to the left hand upper corner, a hopper 1 has a cover 2 removably held in place by wing nuts 3. Below the hopper 1 is a valve 4. The cover 2 is first removed and the valve 4 is closed whereupon the hopper 1 is charged with a quantity of the mix. The cover 2 is then replaced and the wing nuts 3 are tightened. A rubber gasket, too small to show in the drawing, is provided to seal the hopper hermetically.

The valve 4 is connected by a rubber hose 5 to a glass tube 6 which is connected by a rubber hose 7 to the throat 8 of a second hopper 9. When the first hopper 1 has been charged with the mix or a portion of the mix and the cover 2 has been sealed thereon, the valve 4 is opened and in a relatively short time the charge in the first hopper 1 flows into the second hopper 9. The flow of the mix from the hopper 1 to the hopper 9 can be observed from the glass tube 6. The valve 4 should be a valve with rather a generous opening for mixes made out of the larger sizes of abrasive grains. When the mix is in the hopper 9 the valve 4 is closed.

The hopper 9 is connected by a rubber hose 10 to a glass tube 11 which is connected by a rubber hose 12 to a horizontal pipe 13. Extending to the outlet throat 14 of the hopper 9 is a pipe 15 connected to a T-union 16 on which is located a pressure gauge 17. The T-union 16 is connected to a pipe 18 which is connected to a valve 19 connected to a pipe 20 to a pipe 21 which is connected to a T-union 22 which is connected to a pipe 23 to a pipe 24 to a pipe 25 which is connected to a trap 26. The trap 26 is filled with glass wool 27 and in it is a pipe 28 terminating just short of the bottom of the trap 26. The pipe 28 extends through the top of the trap 26 and is connected to a main air supply pipe 29 which supplies air under pressure, which can be any pressure so long as it is sufficient to give the pressure differential hereinafter indicated. A pet cock 30 is provided in the bottom of the trap 26 for discharging condensed water, oil or other liquid caught by the trap 26.

In the absence of any air entering the outlet throat 14 of the hopper 9 the mix would flow downwardly from the hopper 9 through the throat 14, hose 10, glass tube 11, hose 12 and into the horizontal pipe 13 but it would eventually stop flowing because of friction. However the air under pressure carefully adjusted by the valve 19 causes a constant and controlled feeding of the mix into a chamber 31 having a port 32 in the side thereof to which port the pipe 13 is connected by bolts through a plate 33 on the end of a water jacket 34, the other end of which is welded to the pipe 13.

The chamber 31 is conveniently the inside of a hollow metal cylinder 35 which is surrounded with several heating units 36. These heating units may conveniently be of the type now used in domestic stoves and which are well known, consisting of a flattened steel tube packed with magnesia and having inside thereof a resistance wire. The magnesia acts as insulation and keeps oxygen away from the resistance wire while the flattened steel tube holds the magnesia in place. Electrical connections are to the resistance wire inside and not to the flattened steel tube. Heating elements of this kind are now well known. Asbestos covering 37 covers the heating units 36 on the outside of the cylinder 35.

The bottom of the cylinder 35 is flanged and is bolted to the top of a flanged hollow metal cone 38 forming a lower chamber 39. The cone 38 is likewise surrounded by an asbestos covering 40. Between the cylinder 35 and the cone 38 is secured a porous plate 41. A stainless steel porous plate was used but a vitrified ceramic porous plate could equally well be used. The cone 38 has a port 42 to which is connected a pipe 43 connected to a pipe 44 which is connected to a pipe 45 which is connected by a pipe 46 to the inside of a hollow metal cylinder 47 having therein a ceramic pipe 48 which has an outlet 49 in the bottom thereof. Plates 50 and 51 block the top and bottom of the cylinder 47 and through the plate 50 extends a pipe 52 connected to the ceramic pipe 48. The ceramic pipe 48 is wound with resistance wire 53.

The pipe 44 has heating units 54 in contact with it and these may be of the same type as the electrical heating units 36. The pipes 44 and 45 and the cylinder 47 have asbestos coverings, respectively the coverings 55, 56 and 57.

The pipe 52 is connected to a pipe 58 connected to a pipe 59 connected to the top plate 60 of a hollow cylinder 61 in which is a charge of dehydrating agent 62 such as calcium sulphate in lump form. Calcium chloride or zinc chloride could also be used but are a little more expensive than calcium sulphate. The bottom of the cylinder 61 is flanged and is bolted to a metal cup 63 having a pet cock 64 in the bottom thereof. Between the cylinder 61 and the cup 63 is secured a porous plate 65 of the same nature as the porous plate 41.

A pipe extends into the side of the cup 63 and is connected to a pipe 67 which is connected to a pipe 68 which is connected to a globe valve 69 which is connected by a pipe 70 to the T-union 22. Thus air under pressure, controlled by the globe valve 69, goes through the dehydrating agent 62 to the ceramic pipe 48 wherein it is heated on account of the electric current flowing through the resistance wire 53 and the air is further heated by the heating units 54 and then enters the chamber 39, wherein it drops in temperature somewhat due to the mix being colder and comes, in the chamber 31, to a temperature between 40° C. and 200° C., the temperature selected for the chamber 31 being dependent on conditions to be explained. The pressure differential through the mix is a pressure which will fluidize the mix as will be presently explained. It is not considered to be necessary to describe the wiring in detail since it is illustrated in the drawing in conventional manner and the two sides of the circuit can be readily identified as for one side the symbol ± is used and for the other side the symbol ∓ is used. Rheostats 71 and 72 are preferably included in the circuits to control the heating.

Accordingly hot air is flowing upwardly through the porous plate 41 while the mix is entering the chamber 31 through the port 32. This fluidizes the mix, that is to say, as seen through a glass tube 73 which is secured by a ring 74 bolted to the flanged upper end of the cylinder 35, the mix looks a good deal like boiling liquid. The glass tube 73 has a flange 75 surrounded by rubber 76 whereby the tube 73 is sealed to the cylinder 35.

Eventually the chamber 31 becomes full of fluidized mix, through which air is passing, up to the level of a port 77 connected by a pipe 78 to a valve 79 connected to the upper end of a closed metal container 80 having a removable cap 81. When the mix rises to the level of the port 77 it discharges downwardly through the pipe 78 through the valve 79 into the container 80. The mix is cooled as it travels through the pipe 78 because this pipe 78 is surrounded by a coiled pipe 82 through which cold water is pumped. Connected to the water jacket 34 is a cold water supply pipe 83 and the water jacket 34 is connected to piping 82a which can be integral with the coiled pipe 82 and from the coiled pipe 82 the water discharges through a portion 82b thereof to waste or for any use desired. The shape of the piping 82a is diagrammatic in the drawing and of course in actual practice it extends from the water jacket 34 to the coil 82 by the shortest route.

The upper end of the glass tube 73 is flanged and a metal top plate 84 is bolted to a ring 85 under the flange, the connection being sealed and cushioned by rubber 86. Extending through the top plate 84 is a pipe 87 which is connected to a pipe 88 connected to a pipe 89 connected to a pipe 90 which is connected to a valve 91 which is connected to a nozzle pipe 92 extending into a cyclone receiver 93 having a drain plug 94 and into which extends a siphon-shaped tube 95. The lower end of the siphon-shaped tube 95 extends through an unsealed opening 96 into water 97 in a container 98. By means of these connections the air entrained solids and vapors, if any, discharging into the glass tube 73, pass therefrom into the cyclone receiver 93, where the helical rotation thereof imparted by the nozzle pipe 92 separates the entrained solids which fall into the conical bottom of the cyclone receiver 93, ultimately to be removed from time to time by removal of the plug 94. The air passes through the siphon-shaped tube 95 into the water 97 which traps any entrained dust and condenses any condensible vapors; the air exhausts through the unsealed opening 96 into the room.

It is highly desirable that the operator should know the pressure differential between the lower chamber 39 and the upper chamber 31. Accordingly extending through the bottom of the metal cone 38 is a pipe 99 connected to a T-union 100 to which is connected a nipple 101 on the end of which is a rubber hose 102 connected to a glass tube pressure gauge 103 filled with mercury 104. The other end of the gauge 103 is connected by rubber hose 105 to a nipple 106 extending through the plate 84 to the inside of the tube 73. Scale marks 107 on a board 108 to which the pressure gauge 103 is attached permit the operator quickly to read the difference of pressure between the chambers 39 and 31 in inches of mercury.

It is also desirable that the operator should know the temperature in each of the chambers 39 and 31. Accordingly a thermocouple instrument 109 extends through the T-union 100 and the pipe 99 into the chamber 39 and another thermocouple instrument 110 extends all the way to the bottom of a long tube 111 which passes through and is in screw threaded engagement with the plate 84 and extends right down into the chamber 31 as clearly shown.

The clean dry air moving upwardly through the plate 41 fluidizes the mix in the chamber 31 and removes volatile matter from the mix. Fluidizing in accordance with this invention should be short of the transport velocity of the individual particles. A fluidized mix has some of the properties of a liquid and the particles are mobile. The transport velocity of individual particles is reached when individual particles leave the bulk of the mass in this case going well up into the glass tube 73.

It is impossible to define the fluidizing state by reference to pressure alone although with a given apparatus and a given mix too low a pressure will not fluidize at all and too high a pressure will cause individual particles to reach the transport velocity. The differential of pressure between the chambers 39 and 31 must, first of all, overcome the resistance of the porous plate 41. There must be an additional difference of pressure sufficient to fluidize the mix and it should be insufficient to cause the individual particles to reach the transport velocity. This pressure differential can be determined in two practical ways. In the first place visual observation through the glass tube 73 will quickly show when the mix is fluidized and will also indicate when the transport velocity is reached and by adjusting the valve 69 the apparatus can be set to perform the process of the invention.

Another way to determine whether the mix is fluidized according to the invention is to measure the flow of air (with a flow meter anywhere in the line from the T-union 22 to the opening 96 and conveniently between the pipes 67 and 68 or in place of the pipe 70) and then to plot on a graph the velocity of the air against the pressure differential, manipulating the valve 69 to change the values. If the velocity is the horizontal coordinate and the pressure is the vertical coordinate, starting with the valve 69 closed and opening it gradually to full open, taking frequent readings, the values plotted on the graph will result in an upward curve with a comparatively flat portion between steeper slopes. Below the flat portion on the pressure scale the mix has not been fluidized and above the flat portion on the pressure scale the aforesaid velocity of transport has been reached.

The reason why the velocity of the stream of air should be kept below the velocity of transport of the individual particles is that a velocity of the air which does transport the individual particles will carry some particles into the cyclone receiver 93 (where the loose bond is collected) and furthermore not all of the individual particles would be suspended for the same length of time. In a fluidized mix of solid particles the particles are in motion like the molecules in a liquid and individual particles do not long stay in the same place. At air velocities below the velocity to cause fluidization the individual particles move but little and stay in general in the same places. They are merely slightly lifted to let the air through. The difference between a state of fluidization and a state of non-fluidization is readily apparent by visual examination after one has seen the two states so therefore the state of fluidization is a definite state and furthermore is recognized as such in various arts.

The actual pressure differential as measured by the gauge 103 will have different limits for different sizes of apparatus, for plates 41 of different resistances to flow, for mixes of different specific gravity and therefore cannot be given categorically. However I have used a plate 41 having a resistance to flow of about the equivalent of half an inch of mercury, and with apparatus of the proportions shown and in which the chamber 31 had a diameter of four inches I found the process was operable on mixes of alumina abrasive of grit sizes from 24 to 46 with phenolic resin using from about three inches of mercury to about ten inches of mercury pressure differential on the gauge 103. In general varying the grit size of the abrasive does not seem to make much difference in the pressure required but varying the specific gravity (by using different abrasive materials as by changing from silicon carbide, specific gravity 3.2 to zirconia, specific gravity 5.5 to 5.7) does make a difference, the higher the specific gravity the more pressure required, other conditions being equal.

With regard to the temperature of the air in the chamber 31, a temperature below 40° C. would involve keeping the mix too long in a state of fluidization to be practical. The objects of the invention are achieved by removing volatile matter from the mix and this could be accomplished with air at a low temperature, say 20° C. (68° F.) if each individual particle of the mix were in a fluidized mixture for a long enough time, but the time required at below 40° C. to remove enough of the volatile matter to achieve the objects to a substantial degree would be too long, in excess of 60 minutes, to make a commercially practical process. On the other hand temperatures above 200° C. (392° F.) would require too fast a feed of the mix if aggregating of the particles were to be avoided and it is to be avoided as mixes containing a substantial proportion of aggregated particles make inferior abrasive articles. Very fast feeds would make control difficult and impractical. Furthermore carrying out the process at temperatures above 200° C. would be needlessly expensive and would make control difficult. In accordance with the invention in no case should the temperature-time factors be so high and so long as to cure the phenolic resin to the thermo-irreversible stage.

It is possible to carry out the process without any substantial curing, i. e. further polymerizing, of the phenolic resin and I prefer to do so as stronger abrasive products result from mixes having phenolic resin which is as thermo-reactive as it was before mixing. Again whether there is any substantial curing or not depends on both of the factors of time and temperature, but if the temperature is not above 80° C. generally no substantial curing of the phenolic resin will take place and I prefer to use temperatures up to but not above 80° C.

The rate of feed of the mix from the hopper 9 into the chamber 31 is controlled by means of the valve 19. The gauge 17 merely registers the gauge pressure of the air passing through the pipe 15 and gives only a rough indication; during my operations this gauge never measured as much as one pound gauge pressure and it was not calibrated to measure fractions of a pound below one pound. The rate of feed, however, is readily determined by weighing the container 80 before and after an ascertained time of feed. More than one container 80 is preferably provided and containers can quickly be changed by unscrewing the coupling 112 connecting the valve 79 to the container 80, the valve 79 being closed during the brief period of time required. From what has already been said it will be understood that the rate of feed is dependent upon the geometry of the apparatus and the temperature in the chamber 31 but illustratively with the temperature in the chamber 31 at 60° C. I have found that a feed of between one half a pound a minute and two pounds a minute gave good results and the recommended feed is one pound a minute for this particular apparatus.

*Example I*

I prepared a mix as follows: Taking regular alumina abrasive of number 24 grit size in a quantity of 22.4 pounds, I placed it in a mixing pan and added .52 pound of liquid phenolic resin brand BR9332 and mixed until all of the abrasive was wet. I then added 1.78 pounds of powdered phenolic resin of brand BR2417 and .28 pound of cryolite powder (a filler) premixed together and continued the mixing until nearly all of the powder had been picked up by the abrasive granules, leaving less than 1% by weight powder (resin and cryolite) of the total mix. I then charged the hopper 1 with all 25 pounds of the mix, closed and fastened the cover 2, and opened the valve 4 until the mix had descended into the hopper 9 whereupon I closed the valve 4.

Previously the resistances 36, 53 and 54 had been energized, the cold water had been turned on to run through the pipe 83, water jacket 34 and coiled pipe 82 and the valve 69 had been turned on to cause a flow of air through the porous plate 41 and eventually out of the opening 96. The apparatus had been heated to bring the temperature in the chambers 39 and 31 to 75° C. From previous experience I knew about how much to open the valve 69.

Then the valve 19 was opened and I watched the flow through the glass 11 and since this flow is relatively slow previous experience enabled me to tell when it was near the desired rate of one pound per minute as I adjusted the valve 19. Then the process was continued and eventually the chamber 31 was filled and the container 80 received a large portion of the entire mix until there was no more to flow through the pipe 13. The valve 91 was wide open during the entire run. From time to time the rheostats 71 and 72 were adjusted to maintain a temperature of 75° C. in the chamber 39 and a temperature of 60° C. in the chamber 31. The valve 69 was adjusted from time to time as determined by looking at the fluidized mix through the glass 73 and watching the gauge 103 which was kept at about four inches of mercury. The mix remaining in the chamber 31 was collected and added to that collected in the container 80, but in a continuous operation it would not be necessary to remove the cone 38 as more mix would be added to the container 1.

*Example II*

I prepared a mix as follows: Taking regular alumina abrasive of number 46 grit size in a quantity of 20.8 pounds, I placed it in a mixing pan and added .92 pound of liquid phenolic resin brand BR9332 and mixed until all of the abrasive was wet. I then added 3.28 pounds of powdered phenolic resin of brand BR2417 and continued the mix until nearly all of the resin powder had been picked up by the abrasive granules, leaving less than 1% free resin powder by weight of the entire mix. I then charged the hopper 1 with all 25 pounds of this mix, closed and fastened the cover 2, and opened the valve 4 until the mix had descended into the hopper 9 whereupon I closed the valve 4. The resistances 36, 53 and 54 having been previously energized and the cold water having been turned on as in the case of Example 1, I processed this mix just as in the case of Example I except that during the major part of the run the chamber 39 was kept between 65° C. and 70° C. and the chamber 31 was kept between 55° C. and 60° C. This mix was mostly collected in the container 80, the remainder was collected from the chamber 31 as in the previous example.

Mixes made or processed in accordance with the invention are free flowing for at least one day after they have been placed in a closed container. That is to say I placed quantities of abrasive phenolic resin mixes processed in accordance herewith in test tubes, sealed the test tubes, and at the end of one day the mixes were still free flowing meaning that the mix had not caked and substantially none of the individual particles had aggregated. As a matter of fact in accordance with the examples given the mix will remain free flowing as defined for better than one week. Thus, using temperatures between the limits given of 40° C. to 200° C. the length of time that each particle remains suspended in the fluidized mix should be long enough to give the mix the characteristic of being free flowing for at least one day when placed in a closed container. It is impossible otherwise to state for how long the particles should remain in suspension as it all depends upon the temperature of the fluidized mix. It has been indicated that at a temperature of 40° C. the individual particles would have to be in suspension for about 60 minutes to improve the mix to a substantial degree. On the other hand at a temperature of 200° C. the individual particles should probably not be in suspension for more than one or a few seconds. I cannot give exact figures for these limits but the completion of the process can be determined by the length of time the mix, placed in a closed container right after the processing, will remain free flowing, which means uncaked and unaggregated, as above explained. Naturally the length of time will be considerably above the minimum for any given temperature and I can process abrasive phenolic resin mixes so that they will be free flowing when kept in a closed container for a matter of many weeks and even months. I term this resultant of the process stabilizing the mix because it remains in the physical condition in which it was right after processing for the length of time indicated without caking or aggregating. In Example I the individual particles were in suspension in the fluidized mix for about ten minutes and in Example II for about ten minutes.

It is surprising that fluidizing abrasive phenolic resin mixes as described should not cause an unmixing but I have found that no unmixing occurs. This invention is applicable to mixes using all sizes of abrasive grains from the largest to the smallest now used for the manufacture of solid abrasive articles. Without limiting the generality of the foregoing this includes everything from No. 8 grit size to No. 400 grit size.

Mixes made or processed in accordance with this invention can be used in automatic molding machines wherein a hopper is filled with the mix and the machine operates to turn out one molded grinding wheel right after the other without any attention. Such molding machines are now available on the market but hitherto they did not operate in a thoroughly satisfactory manner using abrasive phenolic resin mixes available. Mixes fluidized in accordance with this invention have substantially no loose powder, less than .1% on the total mix by weight, because the very small amount remaining after the mixing operation is diverted to the cyclone receiver 93 and there is no unmixing due to the fluidizing. After the grinding wheels have been molded they are then cured in an oven in the usual manner which I need not describe as it is well known in the art and such grinding wheels have more uniform balance, more consistent values for the modulus of elasticity and higher breakage speeds than heretofore. By processing abrasive phenolic resin mixes according to the present invention the use of cold molding technique can be extended. Furthermore denser wheels can be made thereby.

The advantage of making, before the fluidizing step, an abrasive phenolic resin mix which is as near a "complete pick-up" mix as possible (having less than 1% free powder as defined) is that if this is not done the loss of resin, and filler if any, into the cyclone receiver 93 is greater and furthermore since the amount of free powder is bound to be variable, control of the entire process for the production of uniform abrasive articles is more difficult when there is a lot of free powder in the mix. In other words the loss of resin and filler powders should be kept as low as possible if the abrasive articles are to have the grade and structure planned. The advantage of having practically no loose powder in the final fluidized mix is that any loose powder segregates during molding producing a non-uniform abrasive article. Thus in accordance with this invention extremely uniform phenolic resin bonded solid abrasive articles can be made. The fluidizing in the chamber 31 drives off practically all powder not forming part of an envelope on an abrasive grain, and this powder so driven off, as heretofore indicated, is collected in the cyclone receiver 93.

Other important advantages are inherent in my improved process for the manufacture of abrasive reactive phenolic resin mixes. Heretofore many if not most manufacturers of phenolic resin bonded abrasive articles have used air conditioned rooms in which to make the mixes and in which to mold the articles therefrom. The air conditioning has involved temperature control and humidity control; the former when the outdoor temperature is low is simple enough as the workmen want heated rooms in which to work, but when the outside temperature rises to a high figure such as 95° F., the temperature control involves cooling the room which is expensive. Removing the moisture from the air is also expensive and in general the requirement to do a particular manufacturing operation in an air conditioned room is a nuisance. Hence the fact that abrasive reactive phenolic resin mixes can be made by the process of the present invention in a room which is not air conditioned is a great advantage and so also is the fact that the molding of abrasive articles from such mixes need not be done in an air conditioned room. In fact my invention wholly eliminates the heretofore practical necessity of air conditioning in this art.

A manufacturer, using my process, can manufacture a large quantity of a mix of a certain specification, not just enough for one order, and store the balance beyond the requirements of the orders on hand in a closed container. It is far simpler and more efficient to make substantial quantities of any intermediate product at a given time rather than continually to weight out small batches for small lots of various kinds in accordance with the vicissitudes of the orders received and this is another advantage of my invention.

It will thus be seen that there has been provided by this invention a process in which the various objects hereinabove set forth together with many thoroughly practical advantages are successfully achieved. As various possible embodiments may be made of the mechanical features of the above invention and as the art herein described might be varied in various parts, all without departing from the scope of the invention, it is to be understood that all matter hereinabove set forth or shown in the accompanying drawing is to be interpreted as illustrative and not in a limiting sense.

I claim:

1. In a process for the manufacture of an abrasive phenolic resin mix for the manufacture of solid abrasive articles wherein abrasive grains are wet with a liquid plasticizer and then mixed with phenolic resin in powdered form thus producing a mix of particles each one consisting of a nucleus of hard abrasive coated with an envelope comprising reactive phenolic resin, the improvement which comprises, feeding said mix with gas under pressure into a fluidizing zone, forcing air heated to a temperature between 40° C. and 200° C. upwardly through a porous plate into said zone at a velocity sufficient for suspending said particles in said zone for a period of time sufficient to stabilize said particles in a fluidized condition and withdrawing said fluidized particles from said zone.

2. A process as claimed in claim 1 but in which the temperature is between 40° C. and 80° C.

3. A process as claimed in claim 1 in which the quantities of liquid plasticizer and powder are so selected that the mix contains less than 1% of free powder.

4. A process for the manufacture of an abrasive phenolic resin mix which comprises, providing a quantity of abrasive grains and a liquid plasticizer which is a solvent for powdered phenolic resin, wetting said abrasive grains with said liquid plasticizer, mixing the wet abrasive grains with powdered phenolic resin to produce a mix of particles consisting of a nucleus of abrasive grains coated with an envelope of said powder, feeding said mix with gas under pressure into a fluidizing zone, forcing air heated to a temperature between 40° C. and 200° C. upwardly through a porous plate into said zone at a velocity sufficient for suspending said particles in said zone for a period of time sufficient to stabilize said particles in a fluidized condition and withdrawing said fluidized particles from said zone.

5. A process as claimed in claim 4 but in which the temperature is between 40° C. and 80° C.

6. A process as claimed in claim 4 in which the quantities of liquid plasticizer and powder are so selected that the mix contains less than 1% of free powder.

References Cited in the file of this patent

UNITED STATES PATENTS

| | | |
|---|---|---|
| 1,626,246 | Martin | Apr. 26, 1927 |
| 1,756,772 | Weisberg et al. | Apr. 29, 1930 |
| 2,010,873 | Martin et al. | Aug. 13, 1935 |
| 2,076,517 | Robie | Apr. 6, 1937 |
| 2,084,534 | Martin et al. | June 22, 1937 |
| 2,092,903 | Benner et al. | Sept. 14, 1937 |
| 2,399,717 | Averson | May 7, 1946 |